Dec. 16, 1969   B. M. REILEY   3,483,959
METHOD AND APPARATUS FOR HANDLING AND CONVEYING
A RELATIVELY LONG WORKPIECE
Filed Dec. 11, 1967
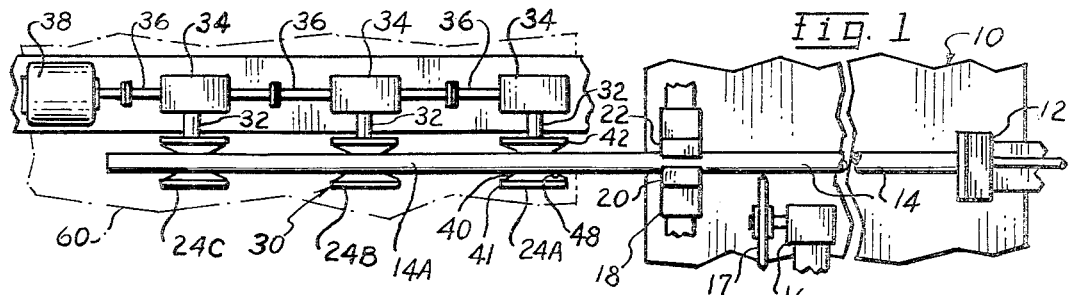
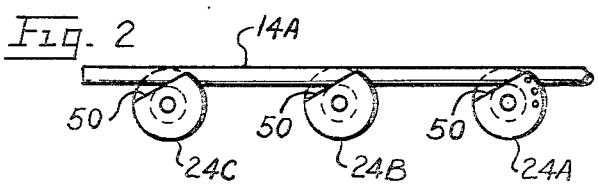 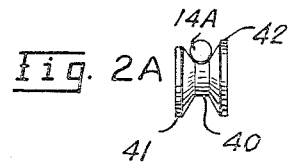
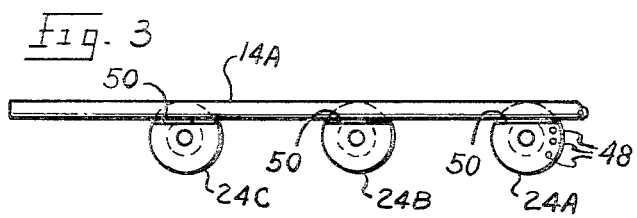 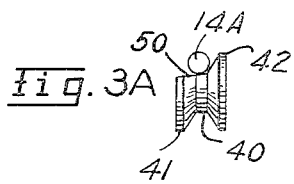
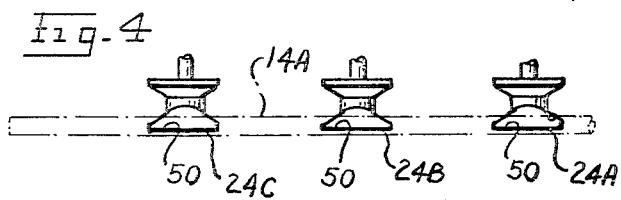
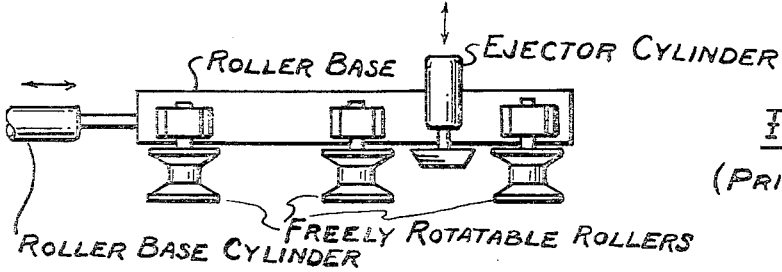
Fig. 7 (PRIOR ART)
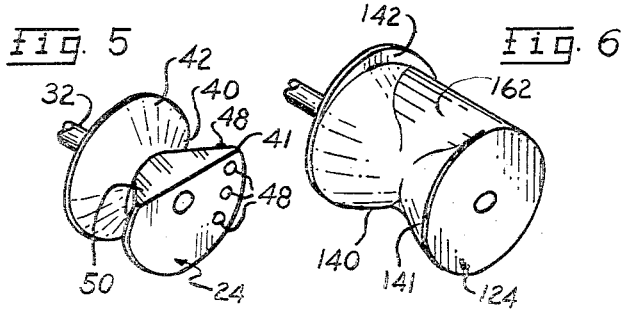 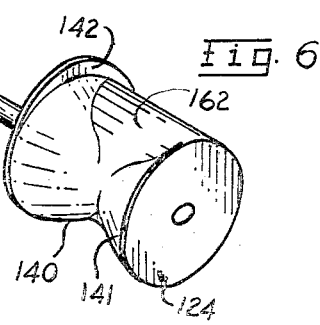
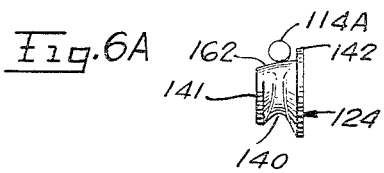
INVENTOR.
Bertrand M. Reiley
BY John Stelmah
His Attorney United States Patent Office 3,483,959
Patented Dec. 16, 1969

3,483,959
METHOD AND APPARATUS FOR HANDLING AND CONVEYING A RELATIVELY LONG WORKPIECE
Bertrand Miles Reiley, Canfield, Ohio, assignor to The Youngstown Sheet and Tube Company
Filed Dec. 11, 1967, Ser. No. 689,720
Int. Cl. B65g 47/82
U.S. Cl. 198—1       8 Claims

ABSTRACT OF THE DISCLOSURE

Method and apparatus for handling and conveying a relatively long workpiece, such as a length of pipe, from a workstation along a longitudinal path and subsequently diverting the workpiece without the need for separate or independent diverting means.

Background of the invention

This invention is directed to method and apparatus for handling and conveying relatively long stock, such as bars, rods, rounds, pipe, etc. (all of which may be referred to as "long workpieces") from a workstation where a workpiece has been securely held while work is being performed thereon. A preferred embodiment of the invention is particularly adapted for use in conjunction with cropping machines, used for cropping the ends of pipe in a pipe fabrication process, and hence the preferred embodiment will be described in connection with a pipe cropping machine.

In the work-handling art, as related to pipe cropping machines, it has been the practice to provide a take-off device for taking away the cropped end of a pipe length. Such take-off devices have incorporated a plurality of V-grooved support rollers mounted on a common reciprocable bed. As a length of pipe, to be cropped, is fed to the cropper, the end to be cropped or discarded overhangs the gripping jaws of the cropper and is supported by the support rollers. After the "cut" is made, the cropped end must be advanced out of the gripping jaws and diverted from the support rollers in readiness for the next cutting operation. In order to accomplish this, the bed supporting the rollers is moved longitudinally away from the jaws, thus carrying the cropped end out of the pipe cropping machine. The bed movement is actuated by means of a pneumatic cylinder. Then separate pneumatic cylinder means are provided to forcibly eject, or divert, the cropped end out of the V-grooved rollers to a conveyor which removes the cropped end. In order to synchronize the operation of the various and numerous hydraulic cylinders, with each other and with respect to the cropping operation, it is necessary to provide a large number of and complex controls. Such controls require considerable maintenance, particularly in steel mill applications where the ambient air is dusty. Any failure in the work-handling system results in "downtime" which interferes with the production of the pipe fabrication process.

Objects and summary of the invention

It is an object of this invention to provide new and improved method and apparatus for handling and conveying long workpieces.

It is another object of this invention to provide more simple and facile method and apparatus for longitudinally advancing a long workpiece from a workstation and transversely diverting the workpiece.

It is a further object of this invention to provide method and apparatus involving work support rollers for handling relatively long workpieces and which do not require the use of separate and independent means for advancing work from a workstation, and of separately powered means for ejecting the work from the support rollers.

A preferred embodiment of this invention is adapted to operate in conjunction with the cropping or end cut-off machine of a seamless pipe stretch mill. After the pipe is formed and "stretched," the pipe is taken to cropping machines where the terminal portions of the pipe lengths are cropped. It is considered necessary to crop these terminal portions because, as a result of the stretching operation, they do not normally meet the wall thickness or dimensional specifications. The pipe lengths are supported on conveying means and are power fed to the cropping machine so that the portion to be cropped is cantileveredly supported from the gripping jaws of the cropping machine vise. The cutter is then moved into cutting position to sever the pipe. It is then necessary to provide separate means for moving the cropped end out of the vise since it is no longer under the influence of the advancing means of the cropping machine.

In accordance with this invention, the cantilever portion of the pipe is supported on a plurality of rotatable support rollers, whose axes are generally parallel to each other. During the advancement of the pipe length through the jaws of the vise, before the pipe end is cropped, the rollers are stationary, i.e., the pipe is slid across the support faces of the rollers. The support rollers are preferably generally V-grooved, through a substantial length of their peripheries, and laterally retain the pipe. After the pipe is cut, the jaws of the vise are opened. The cropped end is then advanced out of the jaws by the rotation of the support rollers. To facilitate this advancement, the rollers are provided with friction means, preferably in the form of magnets, to increase the friction between the rollers and the cropped pipe end. The longitudinal advancement of the cropped pipe end along the path from the vise is continued until the synchronous rotation of the support rollers positions escapement means in registry along the path, which escapement means permits the cropped pipe end to be diverted, without the need of separate and independent means out of the longitudinal path in a direction transverse thereto and onto means such as a removal conveyor. The escapement means is preferably in the form of escapement ports defined by a discontinuity in the peripheral portion of the support roller. The discontinuity or free portion permits the pipe to gravitationally roll from the support surface of the rollers and subsequently onto the removal conveyor for collection at another station.

Description of drawing

The invention will be more fully understood and further objects and advantages thereof will become apparent when reference is made to the following detailed descriptions and to the accompanying drawing, in which:

FIG. 1 is a plan view schematically illustrating a fragmentary portion of a pipe cropping machine and of the work-handling conveying apparatus of this invention;

FIG. 2 is a side elevational view of the rollers illustrated in FIG. 1;

FIG. 2A is an end elevational view of the rollers as illustrated in FIG. 2;

FIG. 3 is a view similar to that shown in FIG. 2, except that the rollers have been rotated into a position where they are in registry along a longitudinal path of the advancing pipe, and illustrates the escapement position;

FIG. 3A is an end elevational view of the rollers as shown in FIG. 3, and illustrating the escapement position wherein the workpiece is free from confinement within the race of the rollers;

FIG. 4 is a plan view of the rollers illustrated in FIG. 3, and with a pipe length, shown in phantom lines, starting to roll away from the rollers just after the rollers have reached the registry position;

FIG. 5 is an isometric view of an individual work support roller illustrating in more detail the escapement means;

FIG. 6 is an isometric view of an alternate form of work support roller;

FIG. 6A is an end elevational view of the support roller shown in FIG. 6, and with the roller being indexed in the escapement position; and FIG. 7 is a schematic plan view of a prior art device.

Description of preferred embodiment

Referring to FIG. 1, the cropping machine 10 schematically illustrated there comprises motive feed means 12 for advancing a pipe length 14 to cutoff mechanism 16. Only one cutoff wheel 17 is shown in connection with mechanism 16, however, it will be understood that a plurality of wheels 17 may be provided and that the wheels may rotate about the pipe 14. The machine 10 is illustrated as further comprising a vise 18 for holding the pipe 14 during the cutting step.

A pipe length 14 is advanced through vise 18, while the jaws 20 and 22 are in a retracted position, with a cantilevered portion 14A being slidably advanced across a plurality of support rollers 24 (further designated 24A, 24B and 24C). The rollers 24 form a part of the handling and conveying apparatus 30 of this invention. The rollers 24 are mounted for rotation on their respective shafts 32 extending from gear boxes 34, which are commonly powered through shafts 36 and electric motor 38. Since the gear boxes 34 are interconnected and commonly powered, the shafts 32 and rollers 24 are synchronously powered.

The rollers 24 are preferably of the V-grooved type, and form a race 40 having a front wall 41 and a rear wall 42. As may be seen in FIG. 2, the plurality of rollers 24 are in registry in a position whereby the pipe length 14 is cradled and may be laterally retained between the walls 41 and 42 during the longitudinal advancing movement. After the cutoff wheel 17 of device 16 crops the end 14A from pipe length 14, the wheel 17 retracts and device 18 opens. When the jaws 20 and 22 are in an open position, the motor 38, through suitable electrical interlocks, is started. Consequently, the rollers 24 start rotating and advancing the cropped end 14A out of the jaws 20 and 22. To facilitate this advancement, friction means, illustrated to be in the form of magnets 48, is provided. It will be understood that other means whereby the friction between the cropped end 14A and the support roller 24 may be increased to provide more positive traction during the advancing movement may be employed. An alternative friction means may be in the form of a knurled surface on that portion of the roller 24 coming into contact with the pipe length 14A during the advancing cycle. Usually, such friction means is only required on one of the support rollers 24, such as first roller 24A.

The rotation of the rollers 24 continues until the escapement ports 50, forming escapement means, are in registry with the longitudinal advancing path of the cropped end 14A, i.e., the escapement ports of the several rollers 24 are in the same relative position, topside, and are longitudinally aligned along said path (FIG. 3). When the ports 50 are so aligned, the cropped end 14A is automatically diverted from the support rollers 24, as may be seen in FIG. 4. A preferred embodiment of the escape means is illustrated as escapement ports, formed by a discontinuity in a front wall portion of the peripheral race. When the discontinuity segments or ports 50 are mutually aligned, so that there is no front restraining portion along a straight line corresponding to the longitudinally advancing path of the cropped pipe end 14A, the pipe end 14A is free to roll and be diverted from the support rollers 24 in a direction generally transverse to said advancing path onto removal conveyor 60.

It will be noted that the rollers 24 are not rotated during the longitudinal advancing and feeding movement of the pipe workpiece 14. Instead the rollers 24 are power driven after the pipe is cut, or other work is performed on it, to register the escapement ports 50 in the escapement position. Consequently, the rollers are selectively stationary during part of the work-handling cycle and selectively rotated during another part of the work-handling cycle. Thus, the rollers may be described as being selectively rotatable from a non-escapement position to an escapement position.

An alternate form of escapement means is illustrated in FIG. 6. There is shown roller 124 having a cam portion 162 forming a part of race 140. The combination of cam portions 162 of two or more rollers 124, when in the registry position with the advancing movement, serve to elevate the pipe length 14A above the front wall 141 so that said tube length 14A may be diverted from the support rollers 24. Also, the cams 162 may be provided as rollers separate from those rollers which define a race 140, but which cams will serve to lift a pipe 14A out of the races of those rollers having races.

While preferred embodiments of the invention have been described, it is to be understood that many modifications of the structure shown and of the precise manner in which the invention is carried into effect as well as in the machine in which it is to be used may be made without departing from the scope of the appended claims.

What is claimed is:

1. Apparatus for handling and conveying long workpieces comprising:
   (a) a plurality of rotatable work support members arranged in spaced apart relation and with their axes of rotation generally parallel to each other;
   (b) at least two of said support members, which may be designated as support race members, each defining an annular race about its respective periphery, in which race a workpiece is supported and laterally retained during advancement of said workpiece in a longitudinal path transverse to said axes of rotation;
   (c) each of said support race members defining escapement means at a portion of its race whereby a workpiece is laterally and gravitationally diverted from said longitudinal path when said escape means are in registry along said longitudinal path; and
   (d) power means for rotating said work support race members in synchronization and to effect said registry.

2. Apparatus as described in claim 1, wherein:
   (a) at least one of said support members is provided with friction means for increasing the frictional contact between said support member and said workpiece during rotation of said support member; and
   (b) said friction means is positioned at the race of a support member.

3. Apparatus as described in claim 1, wherein:
   (a) said race is defined by a pair of mutually opposing wall portions extending through the length of the periphery of the respective support member, which wall portions may be designated as front and rear, and a discontinuity in a segment of a front wall portion of said race; and
   (b) said escapement means is formed by said discontinuity in said segment.

4. Apparatus as described in claim 1, wherein:
   (a) said work support members are rotated by common power means.

5. A takeoff mechanism for advancing relatively long workpieces from a workstation and diverting said workpieces to another station, comprising:
   (a) a plurality of rotatable work supports which are selectively rotated during part of a work-handling cycle, each of said supports having an axis of rotation, and said supports being mounted for rotation with the axes of rotation being spaced apart but sufficiently close for a workpiece to span the space between two adjacent work supports;

(b) said supports also defining escapement means;

(c) at least one of said supports having friction engagement means supported for advancement into frictional engagement with a workpiece and for longitudinally advancing said workpiece along a longitudinal path from said workstation when said one support is rotated; and (d) power means for rotating said work supports during said part of a work-handling cycle in synchronization in a manner whereby the escapement means of said work supports are aligned and permit a workpiece to be gravitationally diverted from said path and said supports when said escape means are aligned in an escapement position.

6. In work handling apparatus, including a plurality of rotatable support members, at least two of which define a race about their respective peripheries, and which may be designated as race rollers, the improvement which comprises:

(a) means for selectively and synchronously rotating said race rollers during part of a work-handling cycle;

(b) friction engagement means mounted by at least one of said rollers, said friction means serving to increase the friction between said roller and workpiece supported thereon; and (c) escapement means defined by each of said rollers whereby a workpiece may be diverted from the advancing path when said escape means are in registry with each other along said advancing path in an escapement position, and without the need of separate means for so diverting said workpiece.

7. In pipe cropping apparatus, which apparatus includes a cutoff device and pipe gripping means, and a pipe takeoff device, which takeoff device comprises:

(a) a plurality of rotatable support rollers;

(b) at least two of said rollers defining a race, about their respective peripheries;

(c) the races being aligned along a path extending longitudinally from said pipe gripping means and adapted to engage a pipe when said pipe is advanced along said path and said rollers are held against rotation;

(d) escapement means at each of said races whereby a pipe may be gravitationally diverted from the cradled position when said escapement means are in a registry position along said path; and (e) means for synchronously rotating said rollers to longitudinally advance a pipe from said gripping means and to bring said rollers in said registry position.

8. A process of advancing a relatively long workpiece from a workstation and diverting said workpiece to another station, which process comprises:

(a) advancing said workpiece along a longitudinal path through said workstation and upon a plurality of spaced apart rotatable work support surfaces, while confining said workpiece from substantial movement in a direction transverse to the advancing movement;

(b) holding said support surfaces against rotation during said advancing movement; and (c) indexing said work support surfaces and thereby advancing said workpiece out of said station, to their respective positions wherein said workpiece is unconfined along one side of said path and is free to fall and be diverted in a direction transverse to the advancing movement.

References Cited

UNITED STATES PATENTS

| 2,397,192 | 3/1946 | Meyerback | 83—156 |
| 2,748,919 | 6/1956 | Britton | 198—127 |
| 2,805,569 | 10/1957 | Billen. | |
| 3,273,693 | 9/1966 | Von Dorp | 198—127 |
| 3,168,183 | 2/1965 | Copper. | |

RICHARD E. AEGERTER, Primary Examiner

U.S. Cl. X.R.

83—156; 198—127